United States Patent [19]
Casal et al.

[11] Patent Number: 5,619,158
[45] Date of Patent: Apr. 8, 1997

[54] HIERARCHICAL CLOCKING SYSTEM USING ADAPTIVE FEEDBACK

[75] Inventors: Humberto F. Casal; Joel R. Davidson; Hehching H. Li; Yuan C. Lo, all of Austin; Trong D. Nguyen, Webster; Campbell H. Snyder, Austin; Nandor G. Thoma, Plano, all of Tex.

[73] Assignee: International Business Machines Corp., Armonk, N.Y.

[21] Appl. No.: 516,704

[22] Filed: Aug. 18, 1995

[51] Int. Cl.$^6$ ..................................................... H03K 5/13
[52] U.S. Cl. ........................ 327/292; 327/147; 327/156
[58] Field of Search ........................... 327/141, 144–153, 327/155–159, 161, 233, 234–236, 243–251, 292, 294, 299

[56] References Cited

U.S. PATENT DOCUMENTS

| | | | |
|---|---|---|---|
| 4,482,819 | 11/1984 | Oza et al. | 307/269 |
| 4,794,596 | 12/1988 | Gloyne et al. | 370/112 |
| 4,805,195 | 2/1989 | Keegan | 375/106 |
| 4,847,516 | 7/1989 | Fujita et al. | 327/293 |
| 4,860,288 | 8/1989 | Teske et al. | 371/1 |
| 5,043,596 | 8/1991 | Masuda et al. | 327/250 |

(List continued on next page.)

FOREIGN PATENT DOCUMENTS

| | | |
|---|---|---|
| 57-80844 | 5/1982 | Japan . |
| 1112838 | 5/1989 | Japan . |
| 2228716 | 9/1990 | Japan . |
| 4373009 | 12/1992 | Japan . |
| 6282350 | 10/1994 | Japan . |

OTHER PUBLICATIONS

IBM Technical Disclosure Bulletin, vol. 17, No. 4, Sep. 1974, pp. 1051–1052 "Programmable On–Chip Clock Generator", W. Cordaro et al.

IBM Technical Disclosure Bulletin. vol. 18, No. 7 Dec. 1975, pp. 2317–2318, "Phase–Lock Loop Using Variable Path Delay as Substitute for Frequency" A.M. Gindi.

IBM Technical Disclosure Bulletin, vol. 19, No. 5, Oct. 1976, pp. 1900–1904, "Synchronized Clocking System" A.M. Gindi et al.

(List continued on next page.)

Primary Examiner—Timothy P. Callahan
Assistant Examiner—T. Lam
Attorney, Agent, or Firm—Laurence R. Letson

[57] ABSTRACT

A clocking system for complex electronic devices is created in an hierarchial manner whereby the master clock pulse is provided to a plurality of digital pulse aligners which in turn provide phase aligned clock signals at the field replaceable unit level to either a slave clock or a digital phase aligner. The slave clock or the digital phase aligner at the field replaceable unit level in turn provides an aligned clock pulse to a timing node on respective chips. A third level of the hierarchy provides similarly aligned pulses to individual using-circuits on the chips of the system. The digital phase aligner, aligning the output pulse at the timing node of the next level with the reference pulses being provided to the digital phase aligner at each level, insures that the timing pulses arriving at the utilizing circuits are synchronously aligned with clock pulses of the master clock. The system provides dramatic simplification of replacement of either field replaceable units or individual components within field replaceable units. The system is self-phasing and self-correcting to accommodate timing misalignments caused by any variations in the timing delays at all levels, thereby reducing the jitter that must be accommodated.

8 Claims, 3 Drawing Sheets

U.S. PATENT DOCUMENTS

| | | | |
|---|---|---|---|
| 5,077,676 | 12/1991 | Johnson et al. | 364/489 |
| 5,087,829 | 2/1992 | Ishibashi et al. | 327/250 |
| 5,122,679 | 6/1992 | Ishii et al. | 327/292 |
| 5,163,068 | 11/1992 | El-Amawy | 375/107 |
| 5,184,027 | 2/1993 | Masuda et al. | 327/245 |
| 5,235,566 | 8/1993 | Merrill | 368/113 |
| 5,258,660 | 11/1993 | Nelson et al. | 327/141 |
| 5,307,381 | 4/1994 | Ahuja | 327/292 |
| 5,317,285 | 5/1994 | Chen | 331/16 |
| 5,341,091 | 8/1994 | Kurita | 324/750 |
| 5,361,277 | 11/1994 | Grover | 327/292 |
| 5,373,535 | 12/1994 | Ellis et al. | 375/106 |
| 5,394,490 | 2/1995 | Kato et al. | 327/292 |
| 5,422,915 | 6/1995 | Byers et al. | 327/292 |

OTHER PUBLICATIONS

IBM Technical Disclosure Bulletin, vol. 37, No. 3, Mar. 1994, pp. 651–652 "High Speed Phase Compensated System Clock Generator".

IBM Technical Disclosure Bulletin, vol. 37, No. 7, Jul. 1994 pp. 401–407. "Proposal of Mechanism for Source Clock Recovery Through Asynchronous Networks".

IBM Technical Disclosure Bulletin, vol. 37, No. 7, Jul. 1994, pp. 615–616, "Single Clock Distribution With Built–in Test Capabilities".

IBM Technical Disclosure Bulletin, vol. 26, No. 8, Jan. 1994 pp. 4161–4162 "Programmable Clock Synchronization In a Skewed Clock Environment", T.A. Stranko et al.

IBM Technical Disclosure Bulletin, vol. 27, No. 1B, Jun. 1984 pp. 795–796, "High Speed Multi–Function Computer Clock Circuit With A Variable Frequency Output" J.M. Fleurbaaij et al.

IBM Technical Disclosure Bulletin, vol. 32, No. 5B, Oct. 1989 pp. 302–307, "Cycle Time Optimization Subject to Performance Constraint".

HIERARCHICAL CLOCKING SYSTEM USING ADAPTIVE FEEDBACK

FIELD OF THE INVENTION

This invention relates to timing of subsystems and components of complex electronic systems and more specifically to clocking the simultaneous operations of components without regard to signal path lengths extending from a master clock to the components.

BACKGROUND OF THE INVENTION

Previously, extensive physical tuning of the clock signal path length has been required to synchronize component operations in electronic devices. As electronic systems, such as computers have progressively become more complex, the timing requirement becomes extremely burdensome. Further, as systems have increased in speed, the need for more precise timing has manifested itself and created an additional burden on the designer. Even as a physically tuned system operates properly, the exchange or replacement of subsystems known as field replaceable units (FRUs) create tuning mismatches which cannot be readily overcome. Accordingly, in order to make FRUs replaceable and effective, it is necessary to physically tune all timing links to a very precise standard.

The same problem is exhibited whenever a chip or component is replaced in the process of repairing FRUs. Such mismatches may result in unreliability or performance degradation.

Alternatively, the system must be designed with sufficient skew budget to accommodate the anticipated misalignment and accommodate the increased jitter or misalignment. Such increased skew budget or allowance results in a corresponding decrease in operating speed of the system. An increase in the allowable skew of the timing signal is antithetical to the goal of increased system operating speed.

A digital phase aligning circuit and method is described in U.S. patent application Ser. No. 08/269,226, filed Jun. 30 1994, entitled Electronically Tunable Computer Clocking System and Method of Electronically Tuning Distribution Lines of a Computer System, by. Robert P. Masleid et al. While this circuit permits alignment of the phases of the clock signal with a reference pulse as received by the circuit, the control of the alignment of pulses at remote FRUs and chips still must be accounted for and controlled.

OBJECTS OF THE INVENTION

It is an object of the invention to simplify synchronization of operations of complex electronic systems and components thereof.

It is another object of the invention to simplify replacement of subsystems and components in a complex electronic system.

It is a further object of the invention to reduce the need to physically tune the conductor paths for clock signals within an electronic system.

SUMMARY OF THE INVENTION

The shortcomings of the prior art are overcome and the object of the invention are accomplished by a clocking arrangement which utilizes a master clock to output a pulse train through multiple parallel clock channels to various subsystems. The subsystems, sometimes called field replaceable units (FRUs), may be replaced for purposes of maintenance, repair or upgrade. Because each and every individual circuit board, electronic circuit., and electronic chip on the FRU inherently have different delays incorporated into the circuits even when the circuit board, circuit or electronic chip is supposed to be identical to other such devices which it replaces, a wide variation in the timing of the circuits and chips may result without utilizing some technique to synchronize the timing.

To avoid the need for physical tuning of each signal conductor in a system it is necessary to be able to adjust the time of flight of timing signals or clock signals while at the same time minimizing the amount of skew between the various timing signals. Further, the Jitter or variation of the time of the leading or trailing edge of a timing pulse must not be exacerbated as the signal is propagated and relayed or system speed must be sacrificed. It also is necessary to be able to coordinate the timing pulses directed to and received by the multitude of circuit boards, circuits and electronic chips so that all of the individual devices receive the clocking pulses within an acceptable time window. It is not practical to provide a separate timing signal over physically tuned signal paths to each circuit directly from a common or master clock.

By treeing the output of a master clock, slave clocks or clock pulse signal sources can operate under the influence of the master clock and large numbers of clock controlled electronic circuits and devices may be clocked or clock controlled. To overcome the variances in timing which result from introduction of the treeing circuits, a digital phase aligner circuit is introduced for each clock channel emanating from a treeing circuit. Phase alignment compensates for the variant amount of delay so that the phase of the clock signal received at a node on a circuit board, chip or circuit is phased and synchronized with a reference pulse received by the phase aligner circuit.

By using the receiving node of the treeing circuit as a common input to the phase aligners of several clocking channels, treeing is accomplished and the clock pulse train on each receiving node of the treeing circuits is phased to a common input. Whether at the FRU, chip, or the circuit level, each clock signal received at a receiving node is phased with the master clock pulse or a pulse phased to the master clock pulse received at the input of the digital phase aligning circuits associated with the master clock.

The oscillator signal to the master clock or the master clock pulse train may be passed through a frequency divider to reduce the frequency to one-half the normal or design operating frequency. The phase alignment is initially accomplished or calibrated during this period of one-half frequency operation. Calibration during this period permits return to full frequency; and upon full frequency operation, the half frequency calibration eliminates the possibility of any received pulse of any clock train being one-half phase or 180° out of phase with regard to the other received pulses at other nodes on different FRUs, circuit boards, or chips.

A more detailed and complete understanding of this invention may be had from a review of the attached drawings and the detailed description of the invention that follows.

DETAILED DESCRIPTION OF THE PREFERRED EMBODIMENT OF THE BEST MODE CONTEMPLATED BY THE INVENTORS FOR CARRYING OUT THE INVENTION

Figure 1:
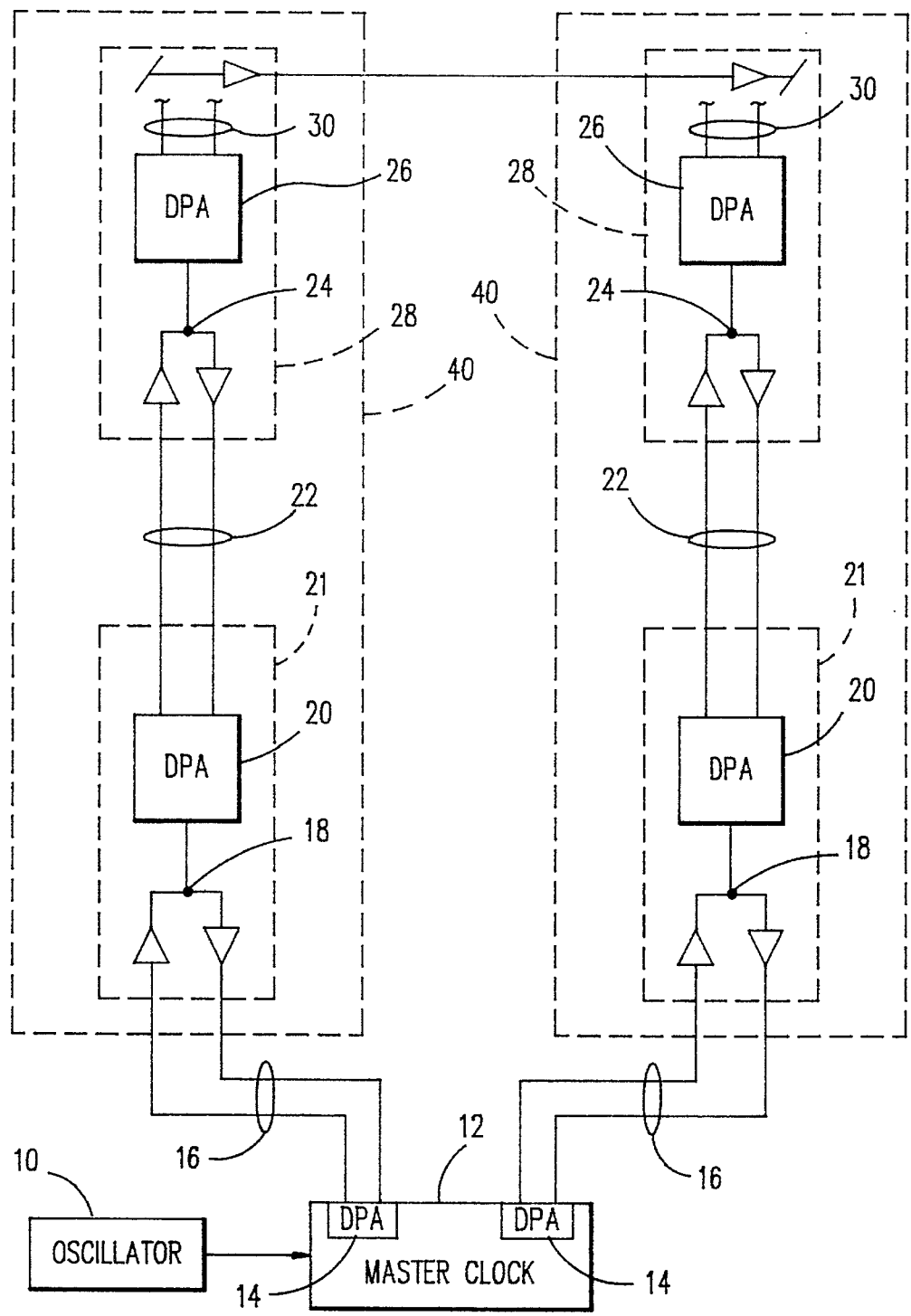
FIG. 1 is a diagram of the hierarchical structure of the clocking system in a simplified electronic system.

Initially referring to FIG. 1, an oscillator 10 provides its output to a master clock 12. Master clock 12 incorporates therein one digital phase aligner (DPA) 14 for each timing signal channel 16. The DPA 14 is connected to an output line and an input line or feedback line which form timing channel 16. The DPA 14 or digital phase aligner 14 may be the type of circuit illustrated in the co-pending U.S. patent application Ser. No. 08/269, 226, referred to above.

Timing signal channel 16 terminates at node 18. Node 18 is connected to or is common with the input terminal of DPA 20. DPA 20 resides on a FRU clock chip 21 and thus is exchanged in the event that the FRU 40 is replaced for maintenance, repair or upgrade of the system or the FRU. DPA 20 provides a relayed clocking signal through timing signal channel 22 to node 24, the input to DPA circuit 26. Node 24 is substantially identical to node 18 of DPA circuit 20. Node 24 and DPA 26 are typically resident upon a logic chip 28. Accordingly, DPA 26 may provide the timing signals to the individual circuits and components resident in logic chip 28. The signal paths of channel 30 connect to the clocking node on the chip 28 which in turn supplies clock signals to the individual utilizing circuits of the chip 28. The timing signal paths from the clocking node to the circuits will be physically tuned in a conventional manner.

Digital phase aligners 14, 20, and 26 all operate in a substantially identical manner and all are dependent upon feedback from the node or circuit to which the timing signal is provided. Therefore, channels 16 and 22 as well as channels 30 have a feedback path connecting the nodes 18 and 24 to the DPAs 14 and 20, respectively, as well as the timing node (not shown) to which the timing signal from the DPA 26 is delivered over timing signal channels 30.

It is not required that timing signal channels such as 16, 22, 30 or 47 be of matched length, delay or physical construction. In fact, one of the advantages of this invention is that the timing channels need not be matched to each other.

It is a requirement that within an individual timing channel, the path for the transmitted clock signal and the path for the feedback signal be matched. As these two signals originate and terminate on the same two chips, this can be accomplished by proper conventional design of the signal paths.

Figure 2:
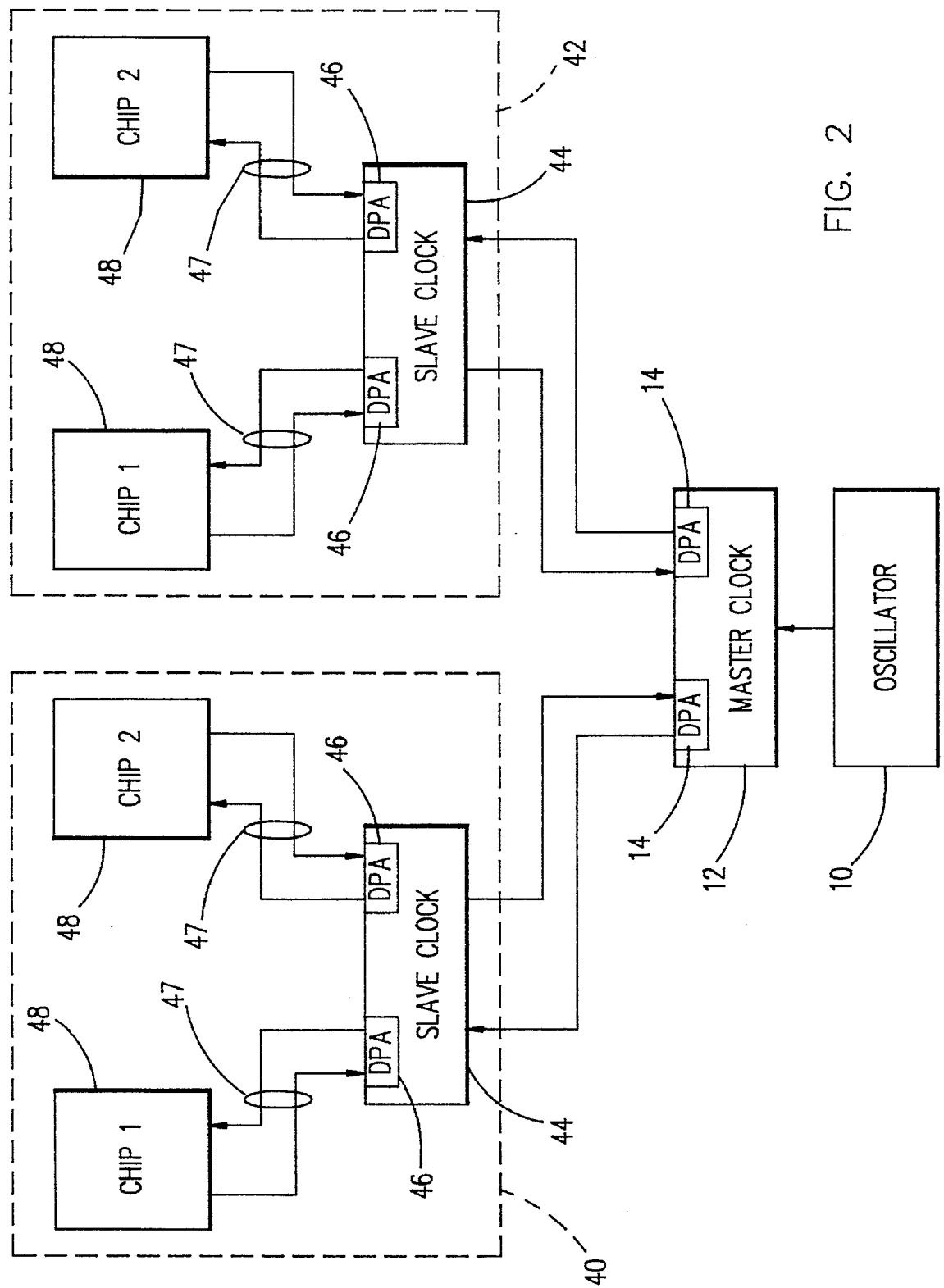
FIG. 2 is a diagram of an embodiment using slave clocks to provide timing controls to a plurality of electronic chips.

FIG. 2 illustrates oscillator 10 and master clock 12 which are interconnected in a very similar manner to two different FRUs, 40 and 42. The arrangement in FIG. 2 utilizes a slave clock 44 on each of the two FRUs 40, 42. Both slave clocks 44 and master clock 12 incorporate in their structures an appropriate quantity of phase aligners 46 and 14. The outputs of DPAs 46 are provided to chips 48 for controlling a DPA that is resident on chip 48 which in turn controls the timing of the circuits on chip 48.

Figure 3:
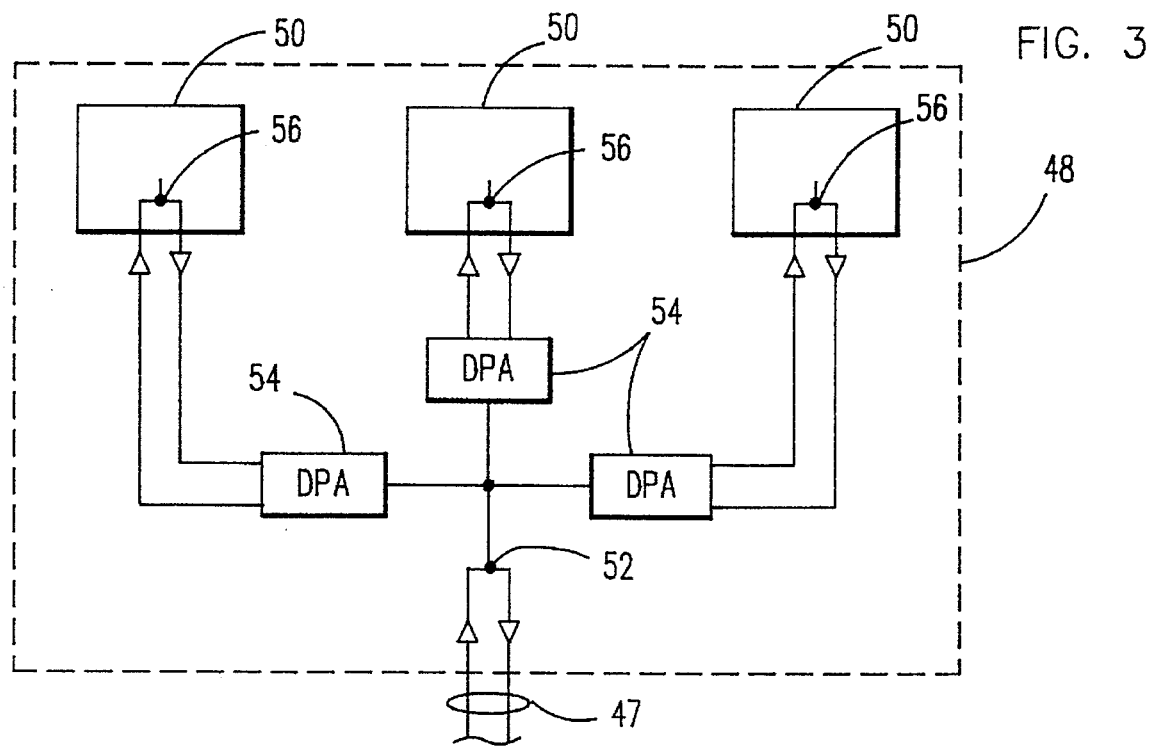
FIG. 3 is a diagram of the portion of FIG. 2 embodying the timing of individual circuits using digital phase alignment circuits for each utilizing circuit.

The implementation of the timing control and synchronization on chip 48 may be understood with reference to FIG. 3. Chip 48 comprises a plurality of circuits 50 which are illustrated as blocks. Circuits 50 may be identical or they may be different in structure and function, the only common requirement being that they require a clock pulse input in order to be synchronized in their operation.

The timing input to chip 48 is provided over timing channel 47 illustrated in FIGS. 2 and 3. Timing channel 47 terminates at a node 52 which then provides a common timing signal to the DPAs 54 which are functionally identical to the DPA 26 of FIG. 1. DPAs 54 in turn provide the timing signal to timing node 56 within each of the circuits 50. As will be understood, each discreet DPA 54 phase aligns the timing signal at its respective node 56 with the reference pulses received at node 52 and, therefore, all the timing pulses at nodes 56 are in synchronization or phased with each other as well as with the reference pulse provided to DPAs 54.

Figure 4:
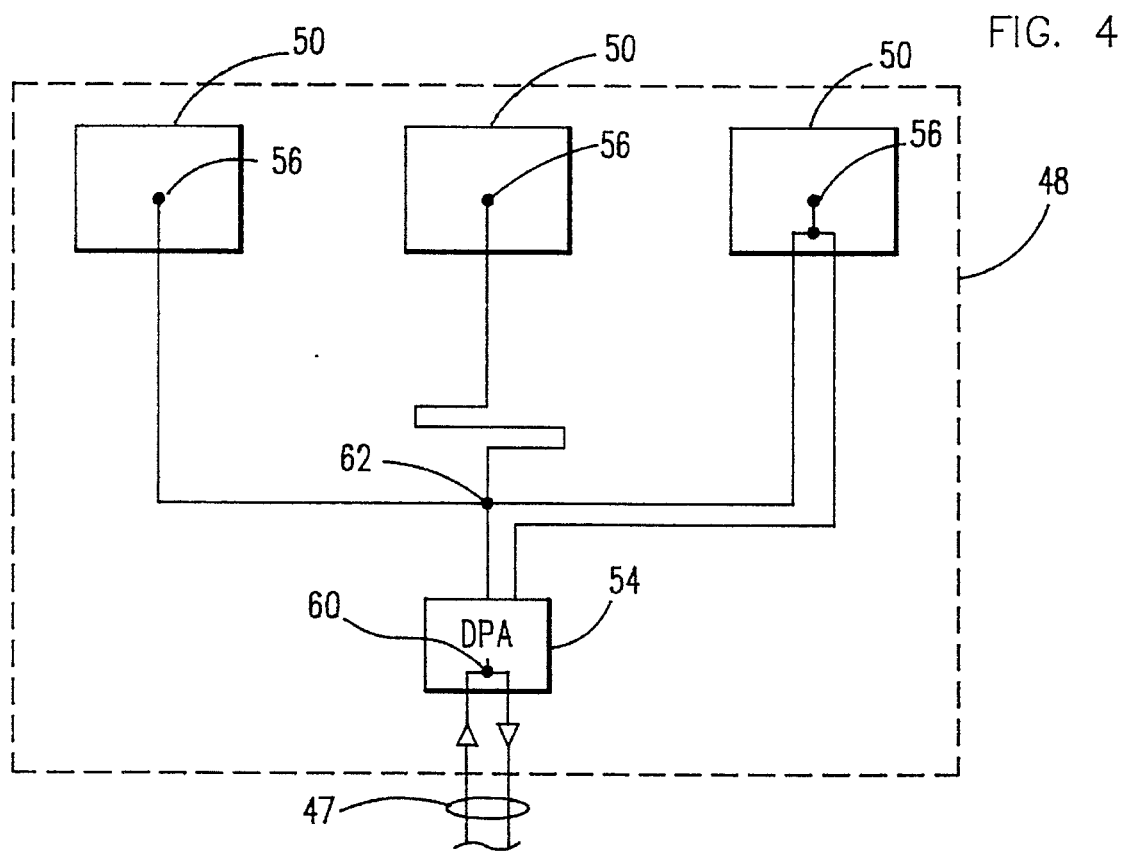
FIG. 4 is a diagram of the timing control network whereby the pulses are phase aligned but the alignment feedback is derived from a single node on a single utilizing circuit.

Another embodiment of the timing of the chips 48 is shown in FIG. 4, wherein it is either very simple or inexpensive to provide the physical tuning between the timing nodes 60 of DPA 544 and the timing nodes 56 of each of the clocked circuits 50. It is practical to use a single DPA 54 to align the phases of the timing signal at the nodes 56 with the phase of the timing signal at node 60 under these circumstances. If this is desired, the path length between DPA 54 and the respective circuits 50 must be physically tuned to provide an equal time-of-flight to each of the respective circuits 50 from node 62. One of the circuits 50 is selected as the source of the feedback and a feedback conductor path is provided from circuit 50 to the DPA 54 to provide the adaptive feedback necessary for adapting the phase alignment. Since the time of flight from the common node 62 to each of the timing nodes 56 is designed to be identical, an adjustment of the phase at one of the nodes 56 will cause a corresponding adjustment of the phase at all nodes 56; and accordingly, only one feedback path need be supplied. An additional advantage of this arrangement is the conservation of the chip surface area necessary for DPA circuits, reduced to that required by a single DPA, thereby making additional surface area available for additional utilizing circuits 50 on the chip 48.

The significant advantages of this invention are appreciated more fully when it is understood how the present invention operates. For a detailed understanding of the operation and structure of each DPA, reference should be made to U.S. patent application Ser. No. 08/269,226. The oscillator 10 in FIG. 1 provides a periodic signal to the master clock 12. The master clock generates a clock signal and conveys it to the digital pulse aligners 14. The digital phase aligners 14 pass the master clock signal to the timing node 18 on the FRU clock chip 21. The master clock 12 is resident within the system but is not required to be resident on the FRU 40. The clock signal presented to the timing node 18 on the FRU clock 21 of each of the FRUs 40 serves as the input reference clocking signal for the digital phase aligner 20. Digital phase aligner 20 then will pass the received signal through the outbound leg of channel 22 to the timing node 24, which similarly acts as the input reference signal for digital phase aligner 26. Digital phase aligner 26 similarly passes the signal on the outbound leg of the channel 30 to the particular circuit which utilizes the timing signal. At each of the timing nodes 18 and 24 as well as a similar node connected to the channel 30, the timing signal is returned as a feedback to the digital phase aligner from which it originally came. As the digital phase aligner detects a phase difference between the reference pulse and the feedback pulse, adjustments are made to bring the two pulses into phase by adding equal delay time to each of both legs of timing channel 16, 22 or 30.

Initially, the DPA 14 will align the phases of the outbound and feedback pulses insuring that the pulse at node 18 is in phase with the pulse of the master clock signal being provided to the DPA 14. During this portion of the initialization, the clock 12 is operated at one-half frequency or the clock signal is passed through a frequency divider to provide an output signal to the DPA 14 which is one-half the normal operating frequency, as discussed in U.S. patent application Ser. No. 08/269,226 of Robert P. Masleid et al.

Once the phases of the outgoing signal and the feedback signal are adjusted and aligned by use of the feedback signal to adapt the time of flight for timing channel 16, 22, or 30, then the master clock signal may be returned to its normal and full operating frequency. Being dependent upon the timing signal at node 18, DPA 20 will similarly phase the pulses so that they are aligned and the pulse at node 24 is aligned with the pulse at node 18. The same process occurs with respect to digital pulse aligner 26 in aligning the pulse at the timing node of the utilizing circuits with the pulse of the timing signal at node 24 which is the input to DPA 26. Each DPA makes the adjustment based on its respective input reference pulse and, accordingly, is adjusting the output as the input is adjusted during calibration and operation.

Because the timing signal is passed through each DPA and is not regenerated, once the frequency of the master clock signal is returned to its full and normal operating frequency after calibration and initialization, the signal frequency or the timing signals on channels 22 and 30 will similarly double due to the doubling of the frequency of the input signals respectively to DPAs 20 and 26.

The system illustrated in FIG. 2 operates in a substantially identical manner with the significant exception being that the slave clocks 44 provide timing signals over channels 47 to more than one chip. Accordingly, it is understood that the DPA 46 serving each of the channels 47 will provide the phase alignment for that particular timing signal directed to one of the chips 48 and that each DPA will align the timing signal phases with the appropriate node signal at chip 48.

Slave clock 44 may be a completely and fully operating clock circuit or it may be replaced with a plurality of DPAs where the input signal to the DPAs is a common signal and is phased properly with the master clock signal as previously described. The slave clocks 44 or the DPAs substituted therefore are timing signal sources.

Referring now to FIG. 3, chip 48 is illustrated as having a plurality of digital phase aligners 54, all fed with a common signal emanating from node 52. When the signal at node 52 is aligned with the reference pulses provided to the upstream DPA, the DPAs 54 all will receive a common input and then through adjustment of the delays in each respective DPA will cause the signal which arrives at node 56 to be synchronized with the other signals arriving at the other nodes 56 and with the reference pulse at node 52.

In the event that the surface area of the chip 48 is not adequate to support three separate DPA circuits, the arrangement in FIG. 4 may be substituted therefore. The signal conveyed over channel 47 to node 60 provides the input reference signal to DPA 54. DPA 54 then propagates the output signal through node 62 to the circuits 50 and their respective timing nodes 56. One will note that the path lengths to all of the circuits 50 are designed to be equal in length or physically tuned to provide equal time of flight between node 62 and timing nodes 56. One of the circuits 50 is selected as the circuit which will provide the feedback for actual phasing. The feedback from that selected circuit 50 to DPA 54 will be used to adapt the timing by providing the phase difference detected by the DPA which then will be eventually nulled out. As the nulling occurs due to adjustment of delay in the delay lines of the DPA, the phase of the timing signal received in each of the timing nodes 56 is brought into phase with the timing signal at node 60. Since the timing signal at node 60 is phased to be brought into synchronization with and alignment with the reference signal and reference pulses upstream, the timing signal will be aligned all the way back to the master clock input to the DPAs in the master clock chip. It will be appreciated that the synchronization of all of the pulses arriving at the timing nodes throughout the entire system, derived from the single master clock 12 of FIGS. 1 or 2 thus will be aligned and synchronized.

With this understanding of the operation of the system, it can be appreciated that a significant advantage and benefit of the disclosed hierarchial clocking system is that either the individual chips, such as those generally illustrated at FIGS. 3 and 4, can be replaced or else an entire FRU may be replaced with an operable replacement; upon re-initialization, all of the DPAs throughout the system will act to align the timing signals and the alignment will propagate through the different hierarchies of the system so that the utilizing circuits 50 will have their input timing signals properly phased and aligned with the master clock signal provided to the DPAs which are a portion of the master clock chip 12.

Similarly, it will be appreciated that the amount of jitter within the system must be controlled and minimized. Where the DPA is provided with a clock pulse train from the master clock the clock pulse is passed through the DPA and is not regenerated. Accordingly, whatever amount of jitter is present in the clock pulse entering the DPA, the same amount of jitter will be propagated through the system without any augmentation. Therefore, if the jitter of the oscillator or that movement of the oscillator pulse from its nominal or perfect position is 50 pico-seconds (ps), then the jitter for the master clock with be a ±50 ps as will the jitter for each successive level. For example, in FIG. 2 the jitter for the master clock 12 the slave clocks 44, and the chips 48 will all be ±50 ps. The jitter will not be improved but it will not be augmented or exacerbated under ideal conditions.

While several illustrations have been made of variations in the system, it should be understood that various other changes or modifications may be made or introduced into the system by one of skill in the art without removing the subject matter of this invention from the scope of the attached claims which serve to define the invention.

We claim:

1. A method of synchronizing operations of components of an electronic system comprising the steps of:

a) converting an oscillator output signal to a master clock signal;

b) providing a first generation clock signal to a plurality of subsystems;

c) digitally aligning pulse phases of said first generation clock signal received at each subsystem with pulse phases of said master clock signal to produce an aligned first generation clock signal;

d) propagating said aligned first generation clock signal as received at each subsystem as second generation clock signals;

e) providing each said second generation clock signal to a plurality of electronic chips;

f) digitally aligning pulse phases of said second generation clock signal as received at each of said plurality of electronic chips with pulse phases of said first generation click signal received by each said subsystem to produce an aligned second generation clock signal;

g) further propagating said aligned second generation clock signals as received at a plurality of electronic chips as third generation clock signals;

h) distributing said third generation clock signals to a plurality of utilizing circuits;

i) digitally aligning each said third generation clock signal as received by at least one utilizing circuit with pulses of said second generation clock signal as received by each chip to produce an aligned third generation clock signal.

2. The method of claim 1 further comprising the step of increasing the frequency of said first generation clock signal to twice the frequency at which said aligning steps were performed.

3. The method of claim 2 further comprising the step of adjusting each of said first generation, second generation and third generation cock signals to maintain each of said clock signals aligned with previous generation clock signal pulses.

4. The method of claim 3 wherein said adjusting is accomplished at all hierarchical levels of said system.

5. A clocking system for controlling an electronic system having a plurality of subsystems comprising:

an oscillator providing a periodic signal;

a master clock circuit connected to and receiving said periodic signal;

a first plurality of digital phase aligner circuits, each connected to said master clock and further connected by a first pair of conductors of equal length to a timing node of a first plurality of timing nodes;

each of said timing nodes individually connected to one of a second plurality of digital phase aligner inputs;

each said digital phase aligner of said second plurality of digital phase aligners connected by a second pair of conductors, both of said conductors of each said second pair being of equal length and further connected to one timing node of a second plurality of timing nodes, each of said second plurality of timing nodes connected to an input of one of a third plurality of digital phase aligners;

each of said third plurality of digital phase aligners connected to a third pair of conductors of equal length, said third pair of conductors joined at one of their ends to form one of a third plurality of timing nodes;

one conductor of each of said first, second and third pairs of conductors forming a feed back path from each said first, second and third timing nodes to each respective digital phase aligner;

whereby all timing nodes within any of said first, second or third plurality of nodes are dynamically phase adjusted to said master clock without regard to inequality of lengths between various of said pairs of conductors.

6. The clocking system of claim 5 wherein each said first plurality of timing nodes are disposed on circuit complexes that are not the site of the first plurality of the digital phase aligner providing a timing signal to said timing nodes.

7. The clocking system of claim 6 wherein each said first, second and third digital phase aligner functions based upon a clocking signal and a feed back signal from a timing node.

8. The clocking system of claim 7 wherein said phasing of a clocking signal at each timing node is based on each said clocking signal received from said timing node by said digital phase aligner providing said clocking signal to said timing node.

* * * * *